United States Patent [19]

Grattan et al.

[11] Patent Number: 5,415,249

[45] Date of Patent: May 16, 1995

[54] AIR/OIL MIXTURE AS A LUBRICANT

[75] Inventors: Esmond Grattan, Rotherham; David Macklin, Hereford, both of England

[73] Assignees: Davy McKee (Sheffield) Limited, Sheffield; Denco Limited, Hereford, both of United Kingdom

[21] Appl. No.: 74,842

[22] PCT Filed: Dec. 17, 1991

[86] PCT No.: PCT/GB91/02258

§ 371 Date: Jun. 9, 1993

§ 102(e) Date: Jun. 9, 1993

[87] PCT Pub. No.: WO92/11490

PCT Pub. Date: Jul. 9, 1992

[30] Foreign Application Priority Data

Dec. 19, 1990 [GB] United Kingdom ............. 9027478

[51] Int. Cl.⁶ .................. F01M 1/00; F16N 7/34
[52] U.S. Cl. ...................... 184/6.26; 184/55.1
[58] Field of Search ............ 184/6.26, 50.2, 55.1, 184/55.2, 57; 137/237; 417/151; 92/13.5

[56] References Cited

U.S. PATENT DOCUMENTS

| | | | |
|---|---|---|---|
| 3,146,681 | 9/1964 | Sheesley | 92/13.5 |
| 3,199,416 | 8/1965 | Robson | 92/13.5 |
| 3,706,355 | 12/1972 | Oglesbee | 184/55.1 |
| 4,785,913 | 11/1988 | Maurer et al. | 184/6.26 |
| 5,154,259 | 10/1992 | Magome | 184/6.26 |

FOREIGN PATENT DOCUMENTS

| | | | |
|---|---|---|---|
| 2304910 | 8/1974 | Germany | 184/55.2 |
| 2435018 | 2/1975 | Germany . | |
| 2540146 | 5/1976 | Germany | 184/6.26 |
| 0001370 | 1/1977 | Japan | 184/55.1 |
| 0831928 | 4/1960 | United Kingdom . | |

Primary Examiner—Edward K. Look
Assistant Examiner—Christopher Verdier
Attorney, Agent, or Firm—Lee, Mann, Smith, McWilliams, Sweeney & Ohlson

[57] ABSTRACT

An air/oil mixture can conveniently be used as a lubricant. To produce the lubricant, oil under pressure is supplied alternately to a pair of separate oil lines (4,5) and at least one dual-line metering valve (8) is connected to the lines to receive oil from each line in turn and to inject a predetermined quantify of oil into a mixing zone each time the supply of oil is changed from one line to the other. Air under pressure is supplied to the mixing zone to mix with the oil injected into the zone.

5 Claims, 2 Drawing Sheets

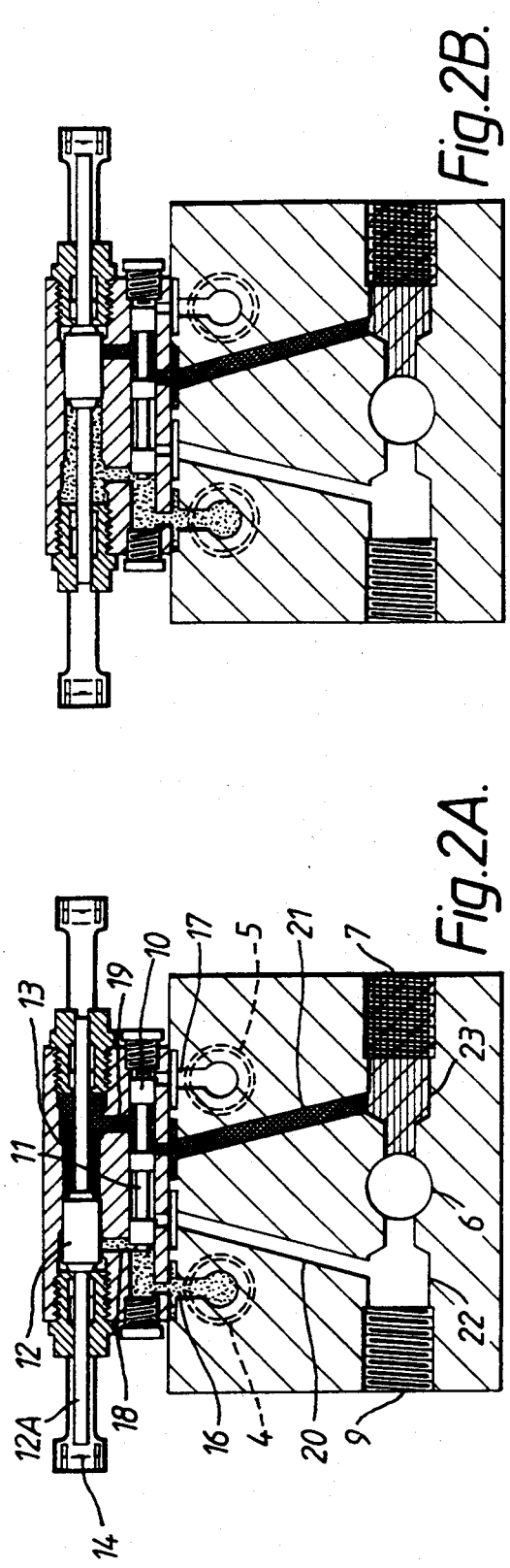

AIR/OIL MIXTURE AS A LUBRICANT

BACKGROUND OF THE INVENTION

This invention relates to a method of, and apparatus for, producing an air/oil mixture which is suitable for use as a lubricant.

Lubrication of bearings and other moving parts on a machine or plant may be carried out automatically using an air/oil mixture as the lubricant. Small droplets of oil are intermittently injected into an airstream and then conveyed by the air to the region where lubrication is required.

SUMMARY OF THE INVENTION

According to a first aspect of the present invention, in a method of producing an air/oil mixture which is suitable for use as a lubricant, oil under pressure is supplied alternately to a pair of separate oil lines; at least one dual-line metering valve connected to the two oil lines receives oil from each line in turn and injects a predetermined quantity of the oil into a mixing zone each time the supply of oil to the valve is changed from one oil line to the other; characterised in that a stream of air under pressure flows continuously through the mixing zone and the oil injected into the zone mixes with the air to form the air/oil mixture.

According to a second aspect of the present invention, in a method of producing an air/oil mixture which is suitable for use as a lubricant, two separate oil lines are pressurised with oil in turn; at least one dual-line metering valve connected to the two oil lines receives a predetermined quantity of oil from each line when that line is pressurised and injects the oil into a mixing zone when the other line is pressurised; characterised in that a stream of air under pressure flows continuously through the mixing zone and the oil injected into the zone mixes with the air to form the air/oil mixture.

Conveniently, the oil under pressure is supplied continuously to a control valve which distributes it alternately to the oil lines.

By arranging for the supply of oil to the two oil lines to be switched at a predetermined rate, the rate of injection of oil into the mixing zone is controlled. Since a predetermined amount of oil is injected into the zone each time the oil is switched from one line to the other, to accurately control the amount of oil in the air/oil mixture, it is only necessary to to control the rate of switching.

Furthermore, it is convenient for the two oil lines to supply oil simultaneously to a plurality of metering valves, each of which also receives a continuous supply of air from a pressurised air supply and an air/oil mixture is formed in the mixing zone of each metering valve.

By arranging for the oil lines to supply all the metering valves simultaneously, it means that, if one of the valves should fail in the closed position, oil is still supplied to the other valves.

According to a third aspect of the present invention, apparatus for producing an air/oil mixture which is suitable for use as a lubricant comprises two separate oil lines; means for pressurising each line with oil in turn; at least one dual-line metering valve connected to the two oil lines to receive a predetermined quantity of oil from each line when that line is pressurised, the or each metering valve having a mixing chamber to which the predetermined quantity of oil is injected when the other line is pressurised; characterised in that means are provided to cause a stream of air to pass continuously through the mixing chamber and for the oil to mix with the air.

It is convenient for each dual-line metering valve to have provision for adjusting the amount of oil which it injects into the mixing chamber each time the supply of oil is changed from one line to the other. Thus, when a plurality of dual-line metering valves are connected to the same two oil lines, each valve will inject a predetermined quantity of oil into its mixing chamber simultaneously with all the other valves, however, the quantity of oil injected by the valves can differ one from another dependent upon the load which requires the air/oil mixture.

In order that the invention may be more readily understood, it will now be described, by way of example only, with reference to the accompanying drawings, in which:

BRIEF DESCRIPTION OF THE DRAWINGS

FIG. 2 shows part of a dual-line metering/mixing valve showing successive steps in its operation.

DESCRIPTION OF THE PREFERRED EMBODIMENT

Figure 1:
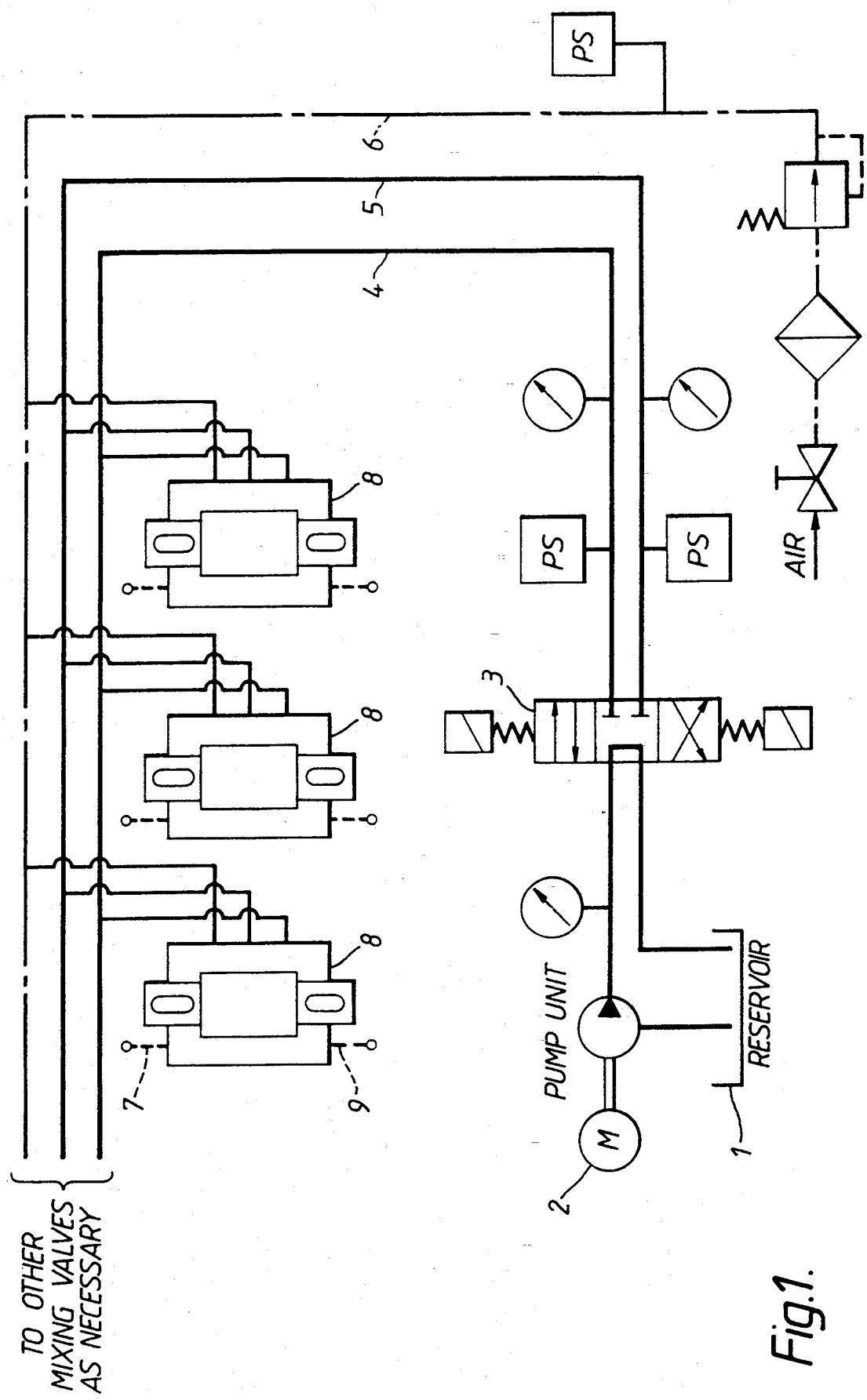
FIG. 1 is a circuit diagram of apparatus in accordance with the present invention.

Referring to FIG. 1, lubricating oil contained in a reservoir 1 is pumped continuously by a motor pump unit 2 to an inlet port of a changeover valve 3. Two separate oil supply lines 4, 5 extend from the valve 3. The valve is a three-position valve and in one position the oil supplied to the valve is returned back to the reservoir 1. In another position of the valve the oil under pressure is supplied to the oil line 4 while the oil line 5 is connected to the reservoir. In the third position the oil is supplied under pressure to oil line 5 and oil line 4 is connected to the reservoir.

A supply of compressed air is connected to an oil line 6. The oil lines 4, 5 and the air line 6 can be of any convenient length and extend alongside the equipment which is to be lubricated. Adjacent each piece of equipment which is to be lubricated, a dual-line metering-/mixing valve 8 is connected to the lines 4, 5 and 6. The mixing valve has a mixing chamber which is connected to the air line 6 and two outlets 7, 9 which are connected either together or separately to the item to which the air/oil mixture is to be supplied. The arrangement enables a plurality of supplies of air/oil mixture to be made to various pieces of equipment and, consequently, each source of air/oil mixture is obtained from a dual-line metering/mixing valve 8. In the arrangement shown in FIG. 1, three separate metering/mixing valves are shown and the valves are connected in parallel to each other so that each valve is connected directly to the oil lines 4, 5 and each valve has its mixing chamber connected to the air line 6.

Each of the metering valves 8 has an oil injector, shown in more detail in FIG. 2. A piston 10 is displaceable in a primary cylinder 11 and a piston 12 is displaceable in a secondary cylinder 13. Piston 12 has a cylindrical extension 12A of reduced cross-section at each end and the extensions serve to locate the piston within the cylinder. At one end of the cylinder 13 there is a screw device 14 to limit the displacement of the piston 12 so that the stroke of the piston within its cylinder can be adjusted. The metering valve has two oil inlet ports 16, 17 which are connected to oil lines 4, 5, respectively. The oil inlet ports 16, 17 are hydraulically connected to opposite ends of the cylinder 11 and, at a position close to the inlet port 16, there is an internal bore 18 connecting the cylinders 11, 13. The bore 18 is connected to the cylinder 13 adjacent one end and a further internal bore 19 connects the other end of the cylinder 13 to the cylinder 11. From positions between the ends of the cylinder 11, there are outlet bores 20, 21 which lead to a mixing chamber 22, 23 from which the outlets 7, 9 extend.

The operation of the dual-line metering valve will now be described.

When the valve 3 is positioned such that the oil under pressure is supplied to oil line 4, oil is supplied to the inlet port 16 of the valve and the pressure of the oil forces the piston 10 to the right-hand end of the cylinder 11 and, at the same time, supplies oil through the bore 18 into the cylinder 13 to the left of the piston 12. The pressure of the oil forces the piston 12 towards the opposite end of its cylinder and the annulus between the cylinder and the extension 12A of the piston 12 is filled with oil. [See FIG. 2B].

As now shown in FIG. 2C, when the valve 3 is switched over so that the oil under pressure is supplied on line 5, oil is introduced into the valve through port 17 and the pressure of the oil moves the piston 10 towards the opposite end of the cylinder 11. The movement of the piston 10 uncovers the port 18 and the oil in the cylinder 13 passes through the bore 18 into the cylinder 11 and out through the bore 20 to mix with air in chamber 22 and be discharged through port 9 to the bearing. In the meantime, oil is flowing from cylinder 11 along the bore 19 to cylinder 13 forcing the piston to the opposite end of the cylinder, as shown in FIG. 2D. This movement forces the oil from the opposite end of the cylinder 11 out through the bore 20. The annulus between the cylinder and the extension 12A on the right-hand end of the piston 12 is filled with oil. When the valve 3 is operated again to pressurise line 4, the situation shown in FIG. 2A exists and the pressure of the oil supplied to the port 6 forces the piston 12 along its cylinder 13 ejecting the oil contained in the cylinder along the bore 19 into the cylinder 11 and out through neighbouring bore 21 to mix with air in chamber 23 and be discharged through port 7 to the bearing.

The extensions 12A are of the same length and cross-section so that, at each end of the piston 12, the annulus between the wall of the cylinder and the extension 12A contains equal quantities of oil so that these equal quantities are injected into the air stream on each stroke of the piston 12. In can be seen, therefore, that, each time the valve 3 switches the oil supply from one of the oil lines to the other, a fixed quantity of oil is ejected from the injector through one of the outlet bores 20, 21. This oil is passed directly into the mixing chamber of the valve to mix with the air from the line 6 which is flowing through the mixing chamber. The air/oil mixture leaves the valve by the lines 7, 9 and is supplied to the bearing or the like which is to be lubricated.

Each time the oil flow is changed from one oil line to the other, a fixed quantity of oil is ejected into either the mixing chamber 22 or 23. By adjusting the displacement of the piston 12, the quantity of oil ejected each time the piston is displaced can be varied.

Advantages which accrue from the present invention are that, for each operation of the valve 3, a preset quantity of oil will be introduced into the mixing chamber of each valve. If one of the metering valves should fail for any reason, the other valves can continue to operate successfully. The amount of oil which is injected into the mixing chamber at each stroke can be adjusted because different types of machines require different volumes of lubricating medium. For example, the injector valve can be adjusted to give from about 0.1 cc to 1.0 cc of oil for each stroke of operation.

The oil and air mixture is formed close to the point where it is to be used, thus reducing distribution problems which occur when the oil and air mixture is supplied along lengthy pipes.

What is claimed is:

1. Apparatus for producing a mixture of air and oil for use as a lubricant comprising first and second separate oil lines;
   means for pressurising each line with oil in turn;
   at least one metering valve connected to the first and second oil lines to receive a predetermined quantity of oil from the first line when that line is pressurised with oil and to inject the oil into a first mixing zone of the valve when the second line is pressurised with oil and to receive a predetermined quantity of oil from the second line when that line is pressurised with oil and to inject the oil into a second mixing zone of the valve when the first line is pressurised with oil; and
   means for supplying air under pressure from a single source simultaneously to each of said mixing zones and each zone having an outlet therefrom for air and oil mixture formed in the zone to flow from the zone.

2. A method of producing a mixture of air and oil for use as a lubricant in which
   a metering valve connected to first and second separate oil lines receives a predetermined quantity of oil from the first line when that line is pressurised with oil and injects the oil into a first mixing zone when the second line is pressurised with oil and receives a predetermined quantity of oil from the second line when that line is pressurised with oil and injects the oil into a second separate mixing zone when the first line is pressurised with oil;
   air under pressure from a single source is supplied simultaneously to each of the mixing zones and the oil injected into each zone mixes with air to form a separate air and oil mixture which flows from said zone.

3. A method as claimed in claim 2 in which oil under pressure is applied continuously to a control valve which distributes it alternately to the first and second oil lines.

4. A method as claimed in claim 2 in which the predetermined quantity of oil received by the metering valve from the first and second oil lines is adjustable.

5. A method as claimed in claim 2 where a plurality of metering valves are connected in parallel to the first and second oil lines and air under pressure from a single source is supplied simultaneously to each of the mixing zones of each of the metering valves.

* * * * *